United States Patent
Lund

(10) Patent No.: US 11,847,563 B2
(45) Date of Patent: *Dec. 19, 2023

(54) ON-DEVICE ARTIFICIAL INTELLIGENCE SYSTEMS AND METHODS FOR DOCUMENT AUTO-ROTATION

(71) Applicant: OPEN TEXT SA ULC, Halifax (CA)

(72) Inventor: Christopher Dale Lund, San Diego, CA (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,651

(22) Filed: Oct. 21, 2022

(65) Prior Publication Data

US 2023/0049296 A1 Feb. 16, 2023

Related U.S. Application Data

(63) Continuation of application No. 17/347,527, filed on Jun. 14, 2021, now Pat. No. 11,509,795, which is a (Continued)

(51) Int. Cl.
*H04N 1/387* (2006.01)
*G06N 3/08* (2023.01)
(Continued)

(52) U.S. Cl.
CPC .............. *G06N 3/08* (2013.01); *G06N 20/00* (2019.01); *G06V 10/242* (2022.01); *G06V 10/82* (2022.01);
(Continued)

(58) Field of Classification Search
CPC .......................... G06V 30/153; H04N 1/3877
See application file for complete search history.

(56) References Cited

U.S. PATENT DOCUMENTS 5,060,276 A * 10/1991 Morris ...................... G06T 7/73
382/156
5,513,304 A * 4/1996 Spitz .................... G06V 30/158
715/268

(Continued)

FOREIGN PATENT DOCUMENTS

EP 3812965 A1 * 4/2021 .......... G06K 9/3208
WO WO-2019232641 A1 * 12/2019 ......... G06K 9/00463

*Primary Examiner* — Ted W Barnes
(74) *Attorney, Agent, or Firm* — Sprinkle IP Law Group

(57) ABSTRACT

An auto-rotation module having a single-layer neural network on a user device can convert a document image to a monochrome image having black and white pixels and segment the monochrome image into bounding boxes, each bounding box defining a connected segment of black pixels in the monochrome image. The auto-rotation module can determine textual snippets from the bounding boxes and prepare them into input images for the single-layer neural network. The single-layer neural network is trained to process each input image, recognize a correct orientation, and output a set of results for each input image. Each result indicates a probability associated with a particular orientation. The auto-rotation module can examine the results, determine what degree of rotation is needed to achieve a correct orientation of the document image, and automatically rotate the document image by the degree of rotation needed to achieve the correct orientation of the document image.

20 Claims, 4 Drawing Sheets

Related U.S. Application Data continuation of application No. 16/819,741, filed on Mar. 16, 2020, now Pat. No. 11,044,382, which is a continuation of application No. 16/272,863, filed on Feb. 11, 2019, now Pat. No. 10,616,443.

(51) Int. Cl.

| | | |
|---|---|---|
| *H04N 1/40* | (2006.01) | |
| *G06N 20/00* | (2019.01) | |
| *G06V 30/148* | (2022.01) | |
| *G06V 30/414* | (2022.01) | |
| *G06V 30/19* | (2022.01) | |
| *G06V 10/82* | (2022.01) | |
| *G06V 10/24* | (2022.01) | |

(52) U.S. Cl.
CPC ...... *G06V 30/153* (2022.01); *G06V 30/19173* (2022.01); *G06V 30/414* (2022.01); *H04N 1/3877* (2013.01); *H04N 1/40012* (2013.01)

(56) References Cited

U.S. PATENT DOCUMENTS

| | | | | |
|---|---|---|---|---|
| 5,832,530 A * | 11/1998 | Paknad | ................ | G06V 30/414 715/235 |
| 6,473,517 B1 * | 10/2002 | Tyan | ................ | G06V 30/153 382/105 |
| 7,016,536 B1 * | 3/2006 | Ling | ................ | G06V 30/15 382/290 |
| 7,215,828 B2 * | 5/2007 | Luo | ................ | G06V 10/242 382/296 |
| 8,855,375 B2 * | 10/2014 | Macciola | ................ | H04N 1/3878 358/448 |
| 8,913,285 B1 * | 12/2014 | Neubrand | ................ | H04N 1/3873 358/1.9 |
| 9,430,766 B1 * | 8/2016 | Kraft | ................ | G06N 3/08 |
| 10,388,099 B2 * | 8/2019 | Luo | ................ | G07D 7/121 |
| 10,423,827 B1 * | 9/2019 | Wu | ................ | G06V 20/70 |
| 10,467,508 B2 * | 11/2019 | Wang | ................ | G06T 7/60 |
| 10,616,443 B1 * | 4/2020 | Lund | ................ | G06V 10/242 |
| 10,867,171 B1 * | 12/2020 | Contryman | ................ | G06V 10/242 |
| 10,891,476 B2 * | 1/2021 | Wang | ................ | G06V 30/416 |
| 11,004,181 B2 * | 5/2021 | Farivar | ................ | G06V 30/40 |
| 2004/0205568 A1 * | 10/2004 | Breuel | ................ | G06F 40/151 715/205 |
| 2006/0045322 A1 * | 3/2006 | Clarke | ................ | G06V 30/2253 382/137 |
| 2006/0123051 A1 * | 6/2006 | Hofman | ................ | G06V 30/244 |
| 2007/0116365 A1 * | 5/2007 | Kloer | ................ | G06T 7/49 382/190 |
| 2008/0008379 A1 * | 1/2008 | Andel | ................ | G06V 10/242 382/141 |
| 2008/0292215 A1 * | 11/2008 | Gaucas | ................ | H04N 1/40062 382/298 |
| 2008/0317341 A1 * | 12/2008 | Speigle | ................ | G06V 10/242 382/170 |
| 2011/0052094 A1 * | 3/2011 | Gao | ................ | G06V 30/1478 382/296 |
| 2012/0092329 A1 * | 4/2012 | Koo | ................ | G06V 20/63 345/419 |
| 2012/0274991 A1 * | 11/2012 | Roy | ................ | H04N 1/40062 382/164 |
| 2013/0022231 A1 * | 1/2013 | Nepomniachtchi | .. | G06Q 20/387 382/229 |
| 2013/0085935 A1 * | 4/2013 | Nepomniachtchi | .. | G06Q 20/387 705/40 |
| 2013/0120595 A1 * | 5/2013 | Roach | ................ | G06V 30/162 348/207.1 |
| 2013/0155474 A1 * | 6/2013 | Roach | ................ | G06V 10/243 358/473 |
| 2013/0297353 A1 * | 11/2013 | Strange | ................ | G06Q 40/08 705/4 |
| 2014/0032406 A1 * | 1/2014 | Roach | ................ | G06Q 20/042 705/42 |
| 2014/0193075 A1 * | 7/2014 | Pavani | ................ | G06V 30/224 382/182 |
| 2015/0262007 A1 * | 9/2015 | Sesum | ................ | G06V 30/414 382/177 |
| 2016/0125613 A1 * | 5/2016 | Shustorovich | ....... | G06V 10/242 382/140 |
| 2016/0140088 A1 * | 5/2016 | Rakita | ................ | G06V 30/414 715/251 |
| 2016/0210507 A1 * | 7/2016 | Abdollahian | ........ | G06V 30/224 |
| 2017/0076152 A1 * | 3/2017 | Asl | ................ | G06V 30/226 |
| 2017/0091950 A1 * | 3/2017 | Munteanu | ................ | G06T 7/269 |
| 2017/0098140 A1 * | 4/2017 | Wang | ................ | G06N 3/045 |
| 2018/0033147 A1 * | 2/2018 | Becker | ................ | G06T 3/0006 |
| 2018/0060704 A1 * | 3/2018 | Xie | ................ | G06T 3/4046 |
| 2018/0114097 A1 * | 4/2018 | Wang | ................ | G06N 3/045 |
| 2018/0211109 A1 * | 7/2018 | Wang | ................ | G06V 30/416 |
| 2018/0314884 A1 * | 11/2018 | Lee | ................ | G06T 7/70 |
| 2018/0342061 A1 * | 11/2018 | Xiang | ................ | G06T 3/60 |
| 2018/0365536 A1 * | 12/2018 | Wang | ................ | G06N 3/045 |
| 2019/0019020 A1 * | 1/2019 | Flament | ................ | G06F 18/213 |
| 2019/0019055 A1 * | 1/2019 | Zhou | ................ | G06T 7/10 |
| 2019/0050639 A1 * | 2/2019 | Ast | ................ | G06V 10/82 |
| 2019/0114743 A1 * | 4/2019 | Lund | ................ | G06V 10/454 |
| 2019/0205638 A1 * | 7/2019 | Zhang | ................ | G06V 10/82 |
| 2019/0251369 A1 * | 8/2019 | Popov | ................ | G06T 5/002 |
| 2019/0311227 A1 * | 10/2019 | Kriegman | ........ | G06V 30/19173 |
| 2020/0259973 A1 * | 8/2020 | Lundwuist | ........... | G06V 10/242 |
| 2020/0311409 A1 * | 10/2020 | Luo | ................ | G06F 18/22 |

* cited by examiner

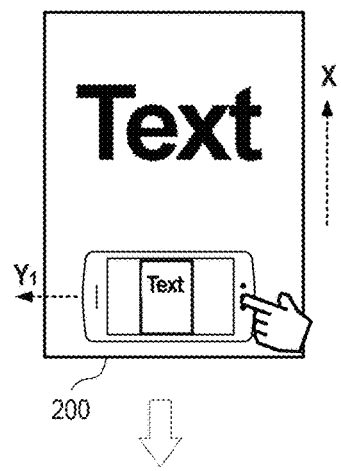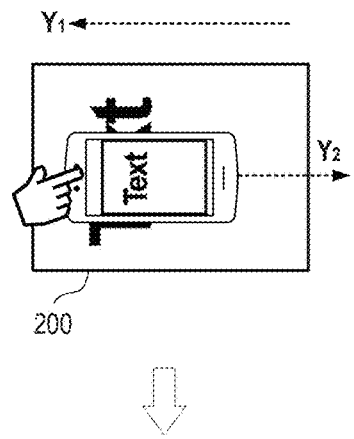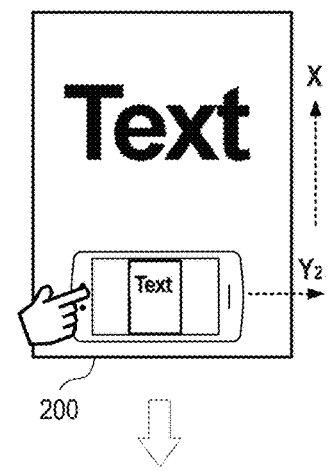
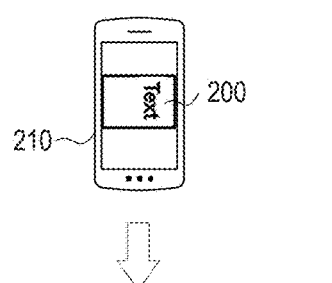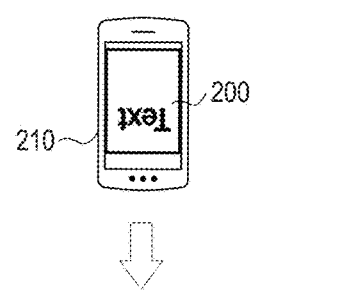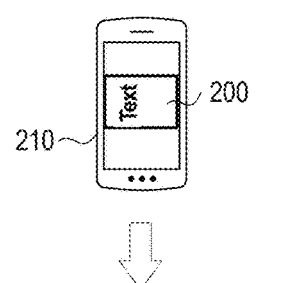
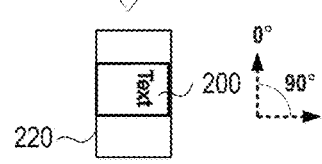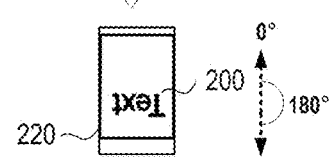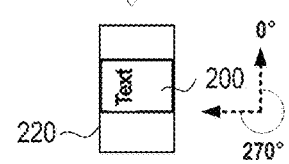
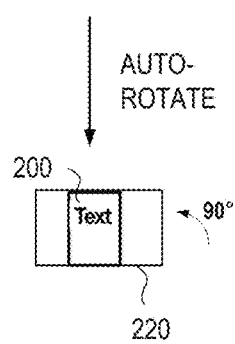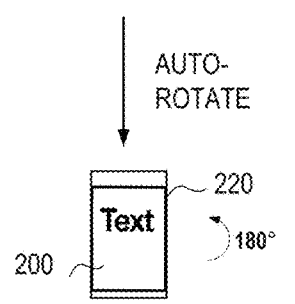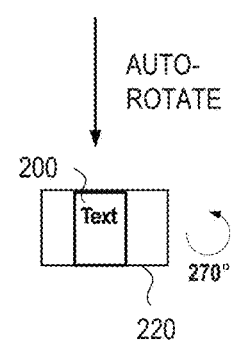
*FIG. 2A*  *FIG. 2B*  *FIG. 2C*

ON-DEVICE ARTIFICIAL INTELLIGENCE SYSTEMS AND METHODS FOR DOCUMENT AUTO-ROTATION

CROSS-REFERENCE TO RELATED APPLICATIONS

This application is a continuation of, and claims a benefit of priority under 35 U.S.C. § 120 from, U.S. patent application Ser. No. 17/347,527 filed Jun. 14, 2021, issued as U.S. Pat. No. 11,509,795, entitled "ON-DEVICE ARTIFICIAL INTELLIGENCE SYSTEMS AND METHODS FOR DOCUMENT AUTO-ROTATION," which is a continuation of, and claims a benefit of priority under 35 U.S.C. § 120 from, U.S. patent application Ser. No. 16/819,741, filed Mar. 16, 2020, issued as U.S. Pat. No. 11,044,382, entitled "ON-DEVICE ARTIFICIAL INTELLIGENCE SYSTEMS AND METHODS FOR DOCUMENT AUTO-ROTATION," which is a continuation of, and claims a benefit of priority under 35 U.S.C. § 120 from, U.S. patent application Ser. No. 16/272,863, filed Feb. 11, 2019, issued as U.S. Pat. No. 10,616,443, entitled "ON-DEVICE ARTIFICIAL INTELLIGENCE SYSTEMS AND METHODS FOR DOCUMENT AUTO-ROTATION," all of which are fully incorporated by reference herein for all purposes.

TECHNICAL FIELD

This disclosure relates generally to the field of data processing. More particularly, this disclosure relates to on-device artificial intelligence systems, methods, and computer program products for document orientation detection and auto-rotation.

BACKGROUND OF THE RELATED ART

Images of documents taken by end-users with mobile devices are typically oriented "right side up." This is not always the case, however, as documents wider than they are tall, such as checks, may be rotated 90° to better fit the frame. Additionally, when a mobile device is held nearly flat, the device might just add an attribute to the image that indicates its orientation without changing the contents of the image. In either case, when the image is received by a system that needs to extract the text, the image may need to be rotated before optical character recognition (OCR) can succeed. Likewise, when document images are captured with a scanning device (e.g., a scanner, a multi-function printer, etc.), the output from the scanning device will match the input. This means that if a paper document was placed on the scanning device upside down, the captured image will be upside down as well.

OCR software today can correct the rotation of an image. However, rotation correction is often slow as it may require testing each possible orientation to determine which orientation returns the highest-quality OCR results. Additionally, although it is often helpful to show a mobile user the document with its proper orientation, OCR-based rotation correction is generally only available on a server as the memory and performance limitations of mobile devices are too constraining.

Another approach to correcting orientation is to use machine learning to detect the rotation of the document. With neural networks, no OCR is necessary, and the system returns the orientation directly given the entire document as the input. Unfortunately, like the OCR-based rotation correction, the memory and performance limitations of high-quality neural networks limit their use on mobile devices.

SUMMARY OF THE DISCLOSURE

An object of the invention is to leverage artificial intelligence (AI) for document orientation detection and auto-rotation. In some embodiments, this object can be realized through a variant of the machine learning (ML) approach. The new ML approach replaces the large, high-quality neural network with a small, fast, low-quality one, then combines the results of multiple assessments from different parts of a document to produce a high-quality assessment of the document's orientation.

In some embodiments, an AI-augmented method for document orientation detection and auto-rotation can include converting, by an auto-rotation module on a user device, a document image to a monochrome image having black and white pixels. The auto-rotation module can segment the monochrome image into bounding boxes. This segmentation can include generating a bounding box that defines a connected segment of black pixels in the monochrome image. In this way, the contents of each such bounding box has a high likelihood of containing at least a letter. The bounding box can provide position information of the connected segment of black pixels in the image. For instance, the bounding box can define a set of coordinates in the monochrome image that contains the connected segment of black pixels.

From the bounding boxes, the auto-rotation module can determine which bounding boxes contain textual snippets (e.g., which connected segments are likely to represent one or more letters in the image). In some embodiments, this determination can entail determining, for each snippet of the monochrome image, a width-to-height ratio defined by a bounding box, determining whether the width-to-height ratio falls outside of a predetermined range, and responsive to the width-to-height ratio falling outside of the predetermined range, discarding the snippet.

The auto-rotation module can then prepare the remaining qualified textual snippets as input to a single-layer neural network. In some embodiments, this preparation can include scaling all the qualified textual snippets from the width-to-height ratio determination to an input size of the single-layer neural network. In some embodiments, the single-layer neural network can accept input images of, for instance, 24×24 pixels.

The textual snippets can then be processed by the auto-rotation module using the single-layer neural network. In some embodiments, the single-layer neural network is trained to recognize a correct orientation of each textual snippet and output a set of results. Each result of the set of results indicates a probability of a degree of rotation needed to achieve the correct orientation of a textual snippet being processed. In some embodiments, the single-layer neural network is configured for outputting, for each textual snippet, a set of results that includes a probability that a zero degree of rotation is needed to achieve the correct orientation of the textual snippet of interest, a probability that a 90 degree of rotation is needed to achieve the correct orientation of the textual snippet of interest, a probability that a 180 degree of rotation is needed to achieve the correct orientation of the textual snippet of interest, and a probability that a 270 degree of rotation is needed to achieve the correct orientation of the textual snippet of interest.

The auto-rotation module can select results from the processing by, for instance, comparing each probability generated by the single-layer neural network with a threshold and discarding those results that fall below the threshold. Based on a majority of the results selected from the processing, the auto-rotation module can then determine a correct orientation of the document image. In this case, the majority of the results indicates a degree of rotation needed to achieve the correct orientation of the document image. With this finding, the auto-rotation module can automatically rotate the document image by the degree of rotation to achieve the correct orientation of the document image on the user device.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 2A-2C depict examples of how paper documents, when captured using a mobile device, may require document orientation detection and auto-rotation.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
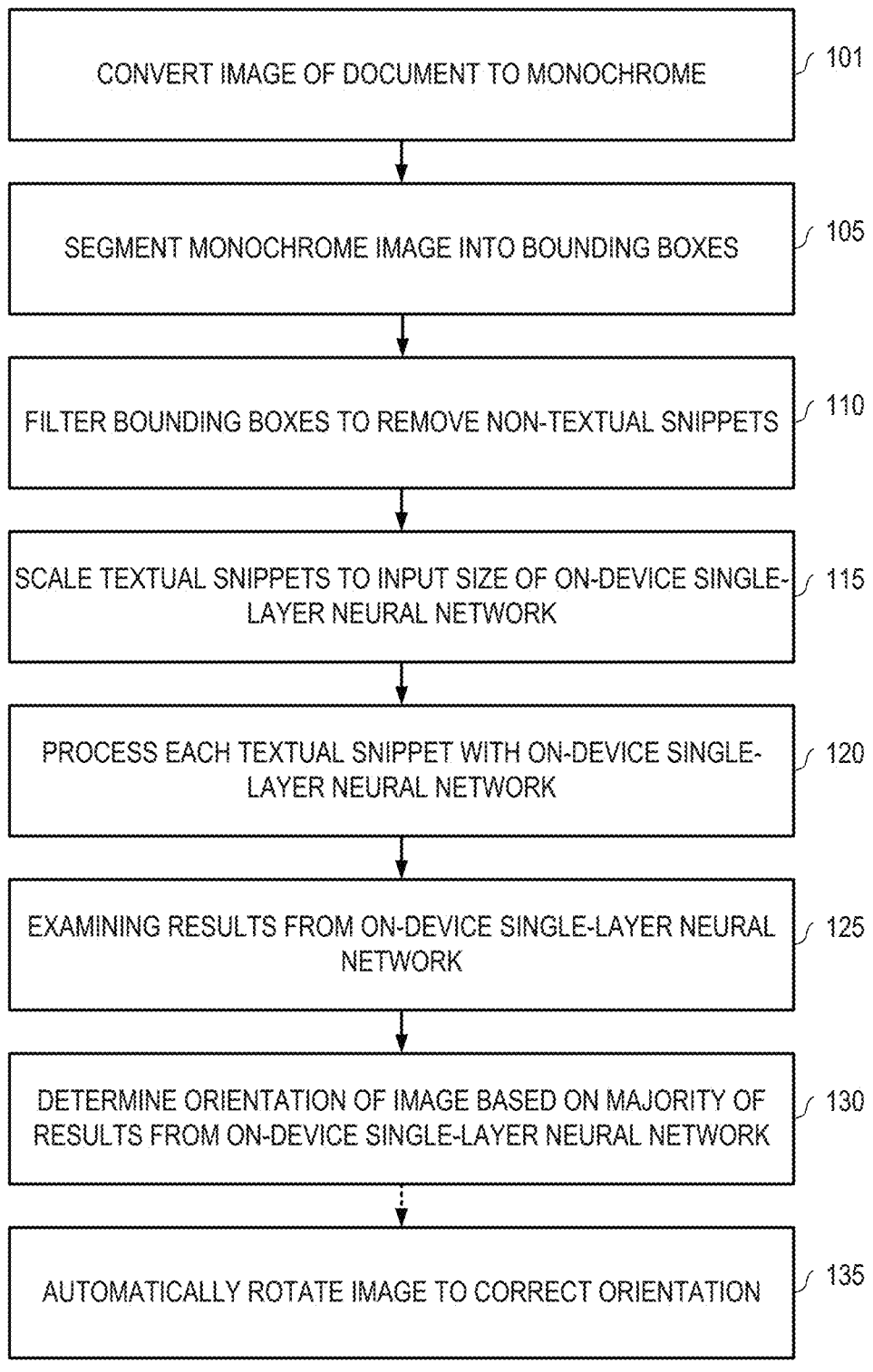
FIG. 1 depicts a flow chart illustrating an example of an AI-augmented method for document orientation detection and auto-rotation according to some embodiments.

FIG. 1 depicts a flow chart illustrating an example of AI-augmented method 100 for document orientation detection and auto-rotation that can be performed by an auto-rotation module on a user device. As illustrated in FIG. 1, method 100 can include converting a document image to a monochrome image having black and white pixels (101), segmenting the monochrome image into bounding boxes (105), filtering the bounding boxes to remove non-textual snippets (110), scaling the textual snippets to an input size supported by an on-device single-layer neural network (115), processing each textual snippet with the on-device single-layer neural network (120), examining/filtering results from the on-device single-layer neural network (125), determining an orientation of the image based on the majority of the results from the on-device single-layer neural network (130), and, where necessary, automatically rotating the image to the correct orientation thus determined (135).

As described above, the methodology disclosed herein takes a new on-device ML approach to the server-based ML approach for document image orientation detection and rotation correction. In this context, some examples of how paper documents can be captured using a mobile device may be helpful.

FIGS. 2A-2C depict non-limiting examples of how paper documents, when captured using a mobile device, may require document orientation detection and auto-rotation. In the example of FIG. 2A, original paper document 200 is oriented "right side up" along the X-axis. A user of mobile device 210 may position mobile device 210 perpendicular to original paper document 200, with mobile device 210 oriented along the Y-axis in the $Y_1$ direction. This arrangement means that the image of original paper document 200 captured by mobile device 210 is actually 90 degrees (90°) or "one-turn" from the correct orientation.

Even when original paper document 200 and mobile device 210 are seemingly positioned in alignment along the same axis, they can be oriented in the opposite directions, as illustrated in the example of FIG. 2B. This arrangement means that the image of original paper document 200 captured by mobile device 210 is actually 180 degrees (180°) or "two-turn" from the correct orientation, similar to the scanning device example described above.

Depending upon how mobile device 210 is oriented relative to original paper document 200, another possible arrangement can mean that the image of original paper document 200 captured by mobile device 210 is actually 270 degrees (270°) or "three-turn" from the correct orientation. This is illustrated in FIG. 2C.

Images captured with one-, two-, or three-turn from the correct orientation would need to be rotated before OCR can be applied. However, as described above, rotation correction is often slow as it may require testing each possible orientation to determine which orientation returns the highest-quality OCR results. Further, OCR-based rotation correction is generally only available on a server due to the memory and performance limitations of mobile devices.

To this end, the auto-rotation module on mobile device 210 can detect that the image of original paper document 200 captured by mobile device 210 is oriented 0° (right side up), 90° (right rotation), 180° (upside down), or 270° (left rotation) from the correct orientation and correspondingly automatically rotate the image 0°, 90°, 180°, or 270° to the correct orientation.

The above examples are directed to four distinct turns (right side up, upside down, right rotation, left rotation). However, other implementations are also possible. That is, the same approach can be used to handle images with a slight turn. For instance, instead of four outputs representing right side up, upside down, right rotation, left rotation, the auto-rotation module can be configured for handling a different number of outputs from the on-device single neural network (e.g., for handling 10 degrees at a time, configure 36 outputs). Those skilled in the art appreciate that the more outputs the longer the auto-rotation can take (e.g., a measure of 200 outputs instead of four outputs may take 50 times longer).

Figure 3A:
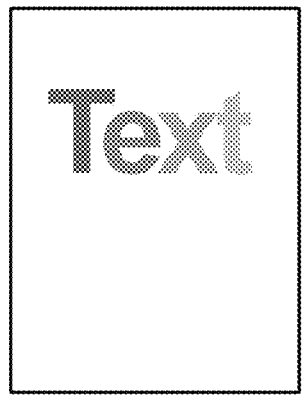
FIG. 3A depicts a diagrammatic representation of an original paper document.

The on-device ML approach will now be described with reference to FIGS. 3A-4. FIG. 3A depicts a diagrammatic representation of an original paper document. As illustrated in FIG. 4, user device 410 in networking computing environment 400 may include camera 401, application 420, and on-device auto-rotation module 430 with single-layer neural network 440. A user of user device 410 can use camera 401 (directly or through application 420) to take a picture of the original paper document shown in FIG. 3A. With the proliferation of smart mobile devices such as smartphones, tablets, etc., user device 410 can be any suitable Internet-enabled mobile device with a built-in camera. Camera 401 can store the picture of the original paper document on user device 410 and/or provide the picture of the original paper document to on-device auto-rotation module 430 (directly or through application 420) as a color image.

In response, on-device auto-rotation module 430 is operable to convert the color image to a monochrome image in black and white. Any suitable image conversion/correction methodologies can be used, so long as the image conversion can separate the letters that make up the text of the image from the background and/or one another. An example of an image converter can be adapted from a class of adaptive binarization. For every pixel, this image converter examines the nearby neighborhood of pixels. If the pixel is darker than its surrounding pixels, it is assumed to be a black pixel.

Figure 3B:
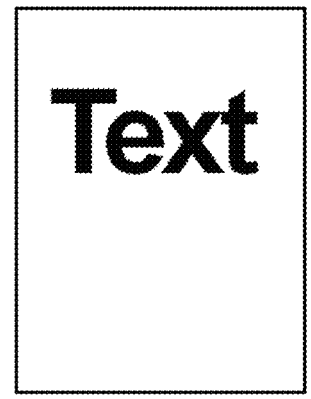
FIG. 3B depicts a diagrammatic representation of a monochrome image of the original paper document shown in FIG. 3A according to some embodiments.
Figure 4:
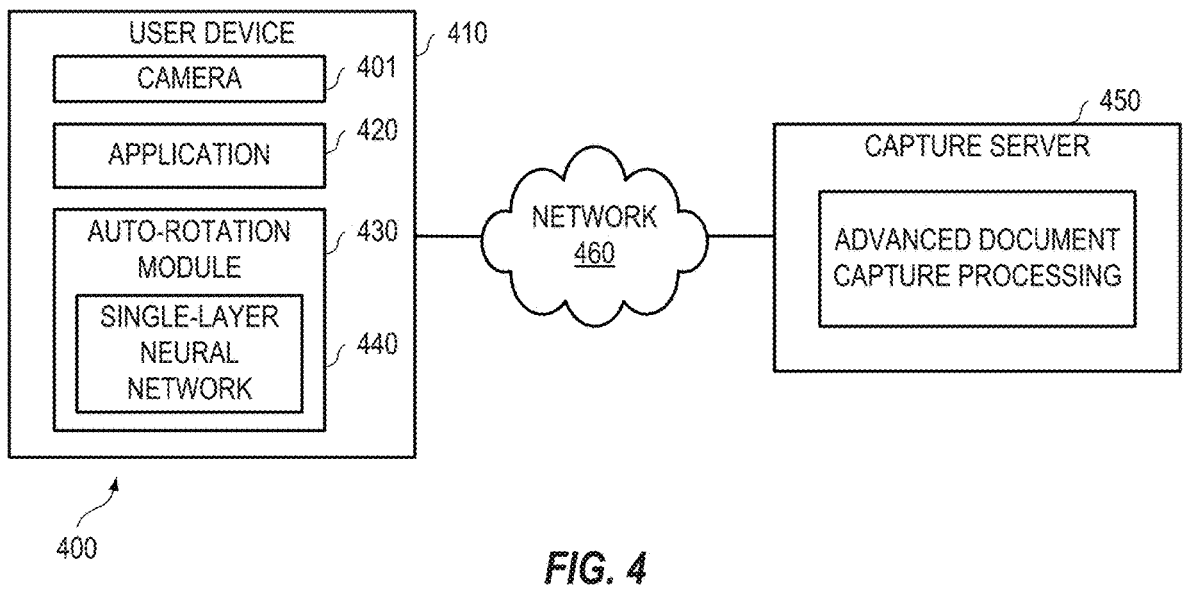
FIG. 4 depicts a diagrammatic representation of a network architecture implementing an AI-augmented method for document orientation detection and auto-rotation according to some embodiments.

FIG. 3B depicts a diagrammatic representation of a monochrome image converted from an image of the original paper document shown in FIG. 3A. An object of this black-and-white image conversion is to find connected segments of pixels. A color or gray-scale image contains pixels in continuous tone, which is difficult for a machine to distinguish between segments of a pixelated image. An additional benefit of performing a black-and-white image conversion is that the converted image is generally smaller than the original image captured by the camera. At this point, on-device auto-rotation module 430 does not distinguish between text and formality/layout information.

Figure 3C:
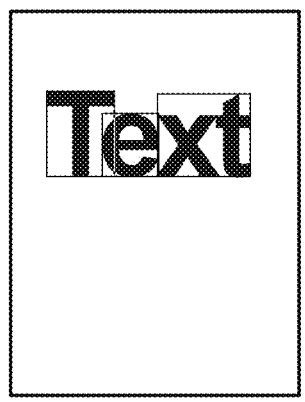
FIG. 3C depicts a diagrammatic representation of a monochrome image of the original paper document shown in FIG. 3A with bounding boxes, each of which defines a connected segment of black pixels in the monochrome image according to some embodiments.

In some embodiments, the monochrome image is segmented to produce one bounding box (e.g., a square or a rectangle) for each connected segment of black pixels. In the example of FIG. 3C, the word "Text" is segmented into a bounding box for "T," a bounding box for "e," and a bounding box for "xt," with the "x" and the "t" connected. The bounding boxes can and often will overlap, but their corresponding segments do not "touch" one another.

Image segmentation can be done using block detection software ("block detector"). Any suitable block detector can be used, so long as the block detector can generate image segments from a black-and-white image. If the entire black-and-white image consists of nothing but text (i.e., no photographs, lines, or other non-textual elements), each bounding box would contain one to a few letters. In practice, however, it is often the case that a captured image will contain non-textual information. Accordingly, in some embodiments, auto-rotation module 430 is operable to convert an image captured by camera 401 into a monochrome image, call a block detector to segment the monochrome image into a set of bounding boxes, and refine the set of bounding boxes generated by the block detector to remove bounding boxes that contain non-textual information.

Figures 3D, 3E:
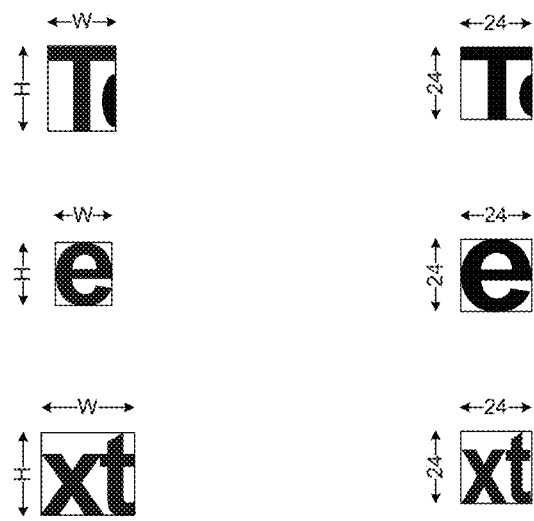
FIG. 3D depicts diagrammatic representations of textual snippets, each of which is contained in a bounding box shown in FIG. 3C according to some embodiments.
FIG. 3E depicts diagrammatic representations of input images prepared into a uniform size from the textual snippets shown in FIG. 3D according to some embodiments.

In some embodiments, this removal process can be done by discarding any bounding box that has a width-to-height ratio outside of a predetermined range. FIG. 3D depicts diagrammatic representations of a set of bounding boxes, each of which has a width ("W") and a height ("H"). As a non-limiting example, a ratio of two sides being in a range of 0.5 to 2.0 is used. For instance, for the letter "T," the width is about 80% of its height, so the width-to-height ratio for the letter "T" is 0.8. Since the width-to-height ratio of 0.8 is within the predetermined range of 0.5 to 2.0, the bounding box for the letter "T" (which is an example of a textual snippet) is not removed. As another example, suppose a bounding box contains a line and the width-to-height ratio for the line is 3.0. Since the width-to-height ratio of 3.0 exceeds the predetermined range of 0.5 to 2.0, the bounding box for the line (which is an example of a non-textual snippet) is removed.

This removal process, which is performed for each bounding box in the set of bounding boxes generated by the block detector, removes those bounding boxes that represent non-textual elements in the image (e.g., lines on a form, signatures, etc.), can also include removing those that are too small (and likely represent noise or punctuation marks) and those that are too large (which often represent photographs, logos, drawings, etc.). For example, a bounding box containing a square logo has an aspect ratio of 1.0 (so it is not removed using the aspect-ratio test described above). However, its size indicates that it likely does not contain text. Therefore, this bounding box is removed. As a non-limiting example, those that are smaller than 20 pixels can be removed, with or without an upper bound. In some embodiments, an expected range of text sizes can be specified and used to guide the upper and lower bounds of acceptable text sizes. For example, for faxes, an 8 point font can be 22 pixels and 266 pixels. Accordingly, an acceptable range of text sizes for faxes can be set to 20-200 pixels.

This removal process produces a filtered set of bounding boxes that have a high likelihood of containing one or more letters. This output can be helpful to the overall capture solution because, as described above, the goal of the overall capture solution concerns text processing. In this context, there is no need for auto-rotation module 430 to process non-textual bounding boxes.

Further, on-device single-layer neural network 440 is trained on text snippets to identify the orientation of the text (e.g., what text is or is not right side up). Thus, it will try to interpret each input image as a letter. Images defined by non-textual bounding boxes can have ambiguous orientations. For instance, the proper orientation of a non-text element such as a vertical line could be 0° or 180°. Thus, suppose on-device single-layer neural network 440 is provided with input images contained in the set of bounding boxes generated by the block detector (with no non-textual bounding box removed by auto-rotation module 430), images defined by non-textual bounding boxes may slow down the learning process as it needs to take more steps to detect the proper orientation of any input image with an ambiguous orientation. That is, on-device single-layer neural network 440 is likely to find multiple possible answers, but it does not know which answer is the right one (e.g., whether 0° or 180° is the correct orientation for the non-text element in the example described above). As a results, on-device single-layer neural network 440 may end up having to take more samples and more steps to learn the right answer. Although on-device single-layer neural network 440 may eventually learn to produce the right result, it may not be as fast. That is, not removing non-textual bounding boxes may affect the time it takes for on-device single-layer neural network 440 to come to a conclusion, but not its ability to come to a conclusion. Because text can help in definitively identifying a correct orientation of a document, by removing non-textual bounding boxes, auto-rotation module 430 can significantly reduce the time it takes on-device single-layer neural network 440 to analyze the text contained in an input image and recognize its correct orientation. This step produces a subset of bounding boxes, each bounding one or more letters (in capital or lower case). That is, each bounding box in the subset represents coordinates that define a textual snippet of the image.

For each bounding box in the subset, auto-rotation module 430 is operable to scale the textual snippet of the image (e.g., "T," "e," and "xt" in the example of FIG. 3C) bound by the coordinates into a fixed or uniform size that matches the input image size of the neural network. This is illustrated in FIG. 3E.

As a non-limiting example, in some embodiments, the input image size of on-device single-layer neural network 440 can be 24×24 pixels. This image scaling process can be done using any suitable interpolation image resizing algorithm (e.g., nearest-neighbor scaling, bilinear and bicubic, sync resampling, box sampling, mipmap, Fourier-transform methods, edge-directed interpolation, hqx, vectorization, etc.). As a non-limiting example, auto-rotation module 430 utilizes the nearest-neighbor scaling method as it is the fastest among all of them. Image scaling can be interpreted as a form of image resampling or image reconstruction from the view of the Nyquist sampling theorem. According to the theorem, down-sampling to a smaller image from a higher-resolution original can only be carried out after applying a suitable 2D anti-aliasing filter to prevent aliasing artifacts. The image is reduced to the information that can be carried by the smaller image. In the case of up sampling, a reconstruction filter takes the place of the anti-aliasing filter.

The image scaling process moves auto-rotation module 430 from examining the coordinates of an image to processing the actual pixels of the image. In some cases, a textual snippet may contain some artifacts (e.g., other parts of the image). As illustrated in FIG. 3D, the bounding box defining the textual snippet "T" also includes part of the letter "e." In some embodiments, such bounding boxes could be filtered out. However, in practice, it is not necessary to remove them. That is, no additional cleaning is done at this level because, even though the snippet is not perfectly clean, it is sufficient for on-device single-layer neural network 440 to recognize the snippet's correct orientation. The effort in doing additional cleaning is not worth the time that it adds, since such artifacts have a negligible effect on on-device single-layer neural network 440. Accordingly, as illustrated in the example of FIG. 3E, the textual snippet "T" which includes part of the letter "e" is kept and scaled into the input image size for on-device single-layer neural network 440.

Once the input images (each of which corresponds to a textual snippet) are prepared, they are provided as input to on-device single-layer neural network 440. In turn, on-device single-layer neural network 440 processes each snippet and outputs a set of four values (weights that add up to 1). Each value represents a probability that the snippet must be rotated 0°, 90°, 180°, or 270° in order to be correctly oriented.

In some embodiments, on-device single-layer neural network 440 can implement a small, fast, single-layer neural network. As those skilled in the ML art can appreciate, traditional convolutional networks (CNNs) have fully connected layers which cannot manage different input sizes, whereas fully convolutional neural networks (FCNs) can have convolutional layers or layers which can manage different input sizes and are faster at that task. This flexibility allows FCNs to be used for classifying an object class for each pixel within an image, with a label for each pixel (i.e., per-pixel classification). This is referred to as semantic segmentation. Semantic segmentation is a much more difficult task than image classification (for recognizing an object class within an image) and object detection (classify and detect an object or objects within an image with bounding box(es)). For this reason, it can be prohibitively complex and difficult to implement FCNs on mobile devices.

To this end, on-device single-layer neural network 440 is configured with a single layer of a particular input size. The training process is similar to other deep learning (DL) model building, training, and testing methods known to those skilled in ML art. Because it is a single fully-connected layer, rather than deploying any sort of a neural network framework, on-device single-layer neural network 440 can be deployed as a FOR loop in code (e.g., 10-15 lines of code) in which each pixel of the 576 pixels in an input image of 24×24 pixels is multiplied by some factor (e.g., pixel 1 times weight 1 plus pixel 2 times weight 2, and so on). The code adds them all up and adds an offset to produce an answer. Below is a non-limiting example of a FOR loop:

```
for each direction d
    scores[d] = offset[d]
    for each pixel p
        scores[d] += weight[d][p] * pixel_value[p]
    probabilities = softmax(scores)
```

Softmax is a machine learning function that can transform a vector (e.g., "scores" in the above example) into probabilities that sum to one. It is often used in the final layer of a neural network-based classifier.

Since no neural network framework needs to be deployed on a mobile device, all the overheads, in terms of size, space, and speed of having a proper neural networking framework, can be avoided. In theory, on-device single-layer neural network 440 can be implemented by any neural networking framework. However, most of them are too complex to make that practical.

The significantly reduced size of the single-layer neural network allows on-device single-layer neural network 440 to be pushed/deployed from a server (e.g., capture server 450) over a network (e.g., network 460) to mobile device 410 and used by and/or embed in a mobile application (e.g., capture client 420). The application can call auto-rotation module 430 and get a decision in return (e.g., whether to rotate and how many turns).

In some embodiments, on-device single-layer neural network 440 can produce a set of results (output values), each representing a probability of an orientation of an input image (which corresponds to a textual snippet). In some embodiments, on-device single-layer neural network 440 can produce a set of four results for each input image, each result representing the number of turns that auto-rotation module 430 may have to make: output 0 means no need to be rotated, output 1 means rotated to the right one. Each value corresponds to that particular number of turns: the first parameter of on-device single-layer neural network 440 is set for 0 turn, the second one is one turn, the third one is two-turn, and the last one is three-turn.

Table 1 below shows examples of results provided by on-device single-layer neural network 440:

| input image | no turn (0°) | one turn (90°) | two turns (180°) | Three turns (270°) |
|---|---|---|---|---|
| e | 0.04 | 0.89 | 0.04 | 0.03 |
| a | 0.7 | 0.1 | 0.1 | 0.1 |
| T | 0.94 | 0.02 | 0.02 | 0.02 |
| O | 0.25 | 0.25 | 0.25 | 0.25 |
| I | 0.5 | 0 | 0.5 | 0 |
| xT | 0.95 | 0.02 | 0.015 | 0.015 |

In some embodiments, auto-rotation module 430 is operable to examine the results provided by on-device single-layer neural network 440. This examination can determine what results should be counted in determining an overall orientation of a document image. In some embodiments, this can be done by comparing each output value (which represents a probability associated with a particular orientation) with a pre-determined threshold (which is configurable and can be applicable to all letters).

In the example of Table 1, the fact that a few of the results for the input image of "e" are less than 0.1 percent and one is almost 0.9 indicates that on-device single-layer neural network 440 is quite confident that the input image needs to be rotated to the right (one turn, by 90°). However, this level of confidence may not be enough. The sensitivity of confidence can be configured by setting the threshold accordingly. Suppose the threshold is 0.9 for all letters, even though on-device single-layer neural network 440 is quite confident that the input image needs to be rotated to the right, the output value associated with that orientation is 0.89, which is less than the given threshold. Accordingly, output values associated with this snippet "e" will be discarded and not used by auto-rotation module 430 to make a decision on the overall orientation of the document image.

Likewise, for the input image of "a," none of the output values meets the threshold of 0.9. Thus, they are tossed and not used in the decision process.

For the input image of "T," the output value for the no turn (0°) orientation exceeds the threshold value of 0.9. Thus, this output value counts as one vote for the no turn (0°) orientation.

For the input image of "O," all the output values do not meet the threshold of 0.9. Thus, they are thrown away and not used further.

Similarly, for the input image of "I," all the output values do not meet the threshold of 0.9. Thus, they are discarded and not used further.

For the input image of "xT," the output value for the no turn (0°) orientation exceeds the threshold value of 0.9. Thus, this output value counts as one vote for the no turn (0°) orientation.

In the examples described above, the letter "T" is likely to have a single high-probability direction, while an "O" is more likely to be equally probable in all four directions due to its rotational symmetry. The probability that a document is rotated once, twice, etc. is the sum of the probabilities of each snippet being rotated once, twice, etc. Some of these letters can only be right side up one way. For instance, for the letter I, it is 50-50 chance that the letter is right side up or upside down. On-device single-layer neural network 440 does not recognize anything in between.

On-device single-layer neural network 440 is trained to figure out all the factors that may affect the orientation of a document, rather than trial and error by a human. The correct orientation of the entire image is then the most common network output for all the values that remain after this thresholding examination.

In some embodiments, not all snippets need to be processed by on-device single-layer neural network 440. For instance, for a given set of N snippets, a statistical analysis can yield the confidence that the most-common output is incorrect for the entire image. Once a confidence has been reached that exceeds a desired threshold, no additional snippets need be processed. Therefore, in some embodiments, auto-rotation module 430 is operable to randomly select snippets and test them, one at a time, through on-device single-layer neural network 440. Meanwhile, auto-rotation module 430 is operable to conduct the statistical analysis and check the confidence until it reaches the proscribed limit.

As a non-limiting example, a single page document may have 300-500 bounding boxes that contain textual snippets. However, through random sampling and testing, it may take only 40-50 of those bounding boxes to be processed to achieve the desired confidence. For instance, when a minimum number of characters (e.g., 15-20 samples/counts) has been reached, auto-rotation module 430 may stop sampling and determine how many votes are for each direction. Suppose 24 votes out of 30 votes are for the right side up orientation, then a decision can be made that the image is right side up. This examination can be an on-going process until a ratio is reached (e.g., 8 out of 10). In practice, it's unlikely that, out of a minimum of 20 samples, 10 votes are counted for one direction and 10 votes are counted for another direction. The minimum number of characters needed to identify an orientation can depend on the level of confidence desired. For instance, it may take a minimum of 15 samples to get a 90% confidence in the decision, 20 samples to get a 95% confidence in the decision, etc. The number of samples can be configurable and can vary from implementation to implementation.

In practice, the on-device ML approach described above can be particularly useful for a server-based capture solution because when a user takes a picture of a document using their device, the capture server does not know, and the user may not know, how the camera captured the document. The camera may be taking an image of the document in any of the four directions and any of them may look correct to the user, depending on how the user positioned the camera relative to the document. This is a quick way to correct the rotation so that some of the processing can be done on the mobile device before sending the image to the capture server. This offloads server-side processing and allows the capture server to efficiently process the document to capture the textual information. Currently, the AI industry is focusing on a single neural network that can do everything really well. The on-device ML approach described above utilizes a single-layer neural network for fast orientation recognition and detection on a mobile device that enables an on-device auto-rotation module to determine whether a document needs to be rotated. With respect to execution time, as compared to a server-side OCR-based solution in which files are already on the server and for which processing time is about a second or two per page, the improvement provided by the on-device ML approach described above is about a fraction of a second (e.g., a $10^{th}$ of a second or a quarter of a second), about 10 times faster. Some server-side non-OCR-based solutions can achieve between a quarter to a half of a second, but the quality of the results is often less than 90% correct. The improvement can be even more significant when a file is not already on a server. This is because the time it takes for a user to take a picture using a mobile device, send it to a server, and get a result back from the server can take even longer. Adding such operational delays (and possible network latency) to the time it takes for the server to analyze the picture, rotate it appropriately, and then send it back to the device, it can take a few seconds to get the correctly rotated picture back to the mobile device, as opposed to a fraction of a second needed by the on-device ML approach described above to process the picture on the mobile device and automatically rotate the picture.

Figure 5:
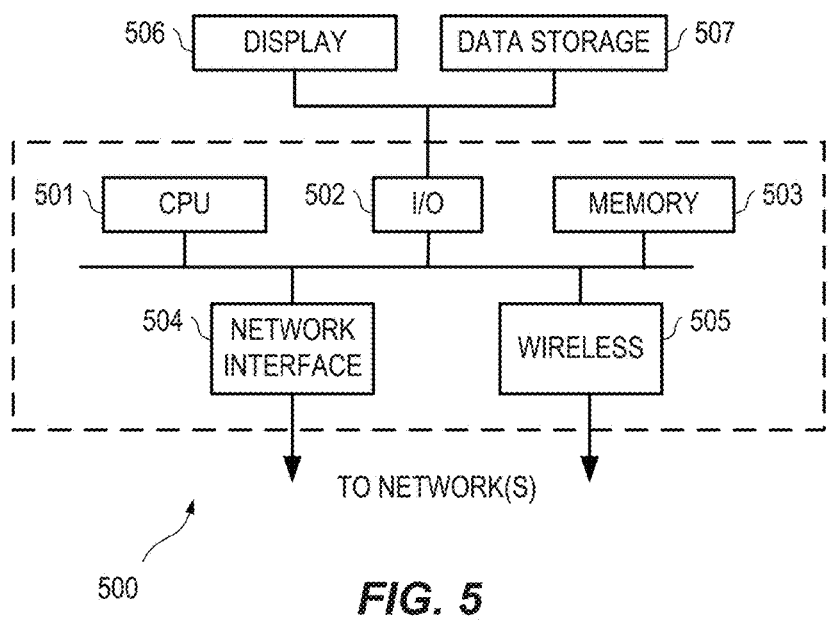
FIG. 5 depicts a diagrammatic representation of a data processing system for implementing an AI-augmented method for document orientation detection and auto-rotation disclosed herein.

FIG. 5 depicts a diagrammatic representation of a data processing system for implementing an AI-augmented method for document orientation detection and auto-rotation disclosed herein. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 905, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a CPU, a ROM, a RAM, a HD, and I/O device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for document auto-rotation, the method comprising:
   determining, by an auto-rotation module, a plurality of textual snippets in a document image;
   preparing, by the auto-rotation module, the plurality of textual snippets for input to a neural network;
   processing, by the auto-rotation module, the plurality of textual snippets using the neural network, wherein the neural network is trained to process an input textual snippet, recognize an orientation of the input textual snippet, and provide an output indicating a degree of rotation needed to correct the orientation of the input textual snippet;

determining, by the auto-rotation module based on outputs from the neural network, a degree of rotation needed to rotate the document image; and rotating, by the auto-rotation module, the document image by the degree of rotation determined based on the outputs from the neural network.

2. The method according to claim 1, further comprising:
segmenting, by the auto-rotation module, the document image into bounding boxes, the segmenting including generating a bounding box defining a connected segment of black pixels in the document image, wherein the bounding box defines a set of coordinates in the document image that contains the connected segment of black pixels.

3. The method according to claim 2, wherein determining the plurality of textual snippets in the document image further comprises determining the plurality of textual snippets from the bounding boxes.

4. The method according to claim 2, further comprising:
randomly selecting textual snippets from the bounding boxes; and
testing each of the textual snippets randomly selected from the bounding boxes using the neural network.

5. The method according to claim 4, further comprising:
conducting a statistical analysis on results from the neural network, wherein the statistical analysis yields a confidence that a most-common output from the neural network is incorrect for the document image; and
checking the confidence during the testing until the confidence reaches or exceeds a proscribed limit.

6. The method according to claim 4, further comprising:
determining whether a minimum number of samples of the textual snippets from the bounding boxes has been reached; and
responsive to the minimum number of samples of the textual snippets from the bounding boxes has been reached, stop randomly selecting textual snippets from the bounding boxes and determining, based on the testing, how many votes are for each of a plurality of directions.

7. The method according to claim 1, wherein the neural network is configured for outputting a probability value indicating that a zero degree of rotation or zero number of turns is needed to correct the orientation of the input textual snippet, a probability value indicating that a 90 degree of rotation or a single right or left turn is needed to correct the orientation of the input textual snippet, a probability value indicating that a 180 degree of rotation is or two right or left turns are needed to correct the orientation of the input textual snippet, and a probability value indicating that a 270 degree of rotation is or three right or left turns are needed to correct the orientation of the input textual snippet.

8. A system for document auto-rotation, the system comprising:
a processor;
a non-transitory computer-readable medium; and
stored instructions translatable by the processor for:
determining a plurality of textual snippets in a document image;
preparing the plurality of textual snippets for input to a neural network;
processing the plurality of textual snippets using the neural network, wherein the neural network is trained to process an input textual snippet, recognize an orientation of the input textual snippet, and provide an output indicating a degree of rotation needed to correct the orientation of the input textual snippet;

determining, based on outputs from the neural network, a degree of rotation needed to rotate the document image; and rotating the document image by the degree of rotation determined based on the outputs from the neural network.

9. The system of claim 8, wherein the stored instructions are further translatable by the processor for:
segmenting the document image into bounding boxes, the segmenting including generating a bounding box defining a connected segment of black pixels in the document image, wherein the bounding box defines a set of coordinates in the document image that contains the connected segment of black pixels.

10. The system of claim 9, wherein determining the plurality of textual snippets in the document image further comprises determining the plurality of textual snippets from the bounding boxes.

11. The system of claim 9, wherein the stored instructions are further translatable by the processor for:
randomly selecting textual snippets from the bounding boxes; and
testing each of the textual snippets randomly selected from the bounding boxes using the neural network.

12. The system of claim 11, wherein the stored instructions are further translatable by the processor for:
conducting a statistical analysis on results from the neural network, wherein the statistical analysis yields a confidence that a most-common output from the neural network is incorrect for the document image; and
checking the confidence during the testing until the confidence reaches or exceeds a proscribed limit.

13. The system of claim 11, wherein the stored instructions are further translatable by the processor for:
determining whether a minimum number of samples of the textual snippets from the bounding boxes has been reached; and
responsive to the minimum number of samples of the textual snippets from the bounding boxes has been reached, stop randomly selecting textual snippets from the bounding boxes and determining, based on the testing, how many votes are for each of a plurality of directions.

14. The system of claim 8, wherein the neural network is configured for outputting a probability value indicating that a zero degree of rotation or zero number of turns is needed to correct the orientation of the input textual snippet, a probability value indicating that a 90 degree of rotation or a single right or left turn is needed to correct the orientation of the input textual snippet, a probability value indicating that a 180 degree of rotation is or two right or left turns are needed to correct the orientation of the input textual snippet, and a probability value indicating that a 270 degree of rotation is or three right or left turns are needed to correct the orientation of the input textual snippet.

15. A computer program product for document auto-rotation, the computer program product comprising a non-transitory computer-readable medium storing instructions translatable by a processor for:
determining a plurality of textual snippets in a document image;
preparing the plurality of textual snippets for input to a neural network;

processing the plurality of textual snippets using the neural network, wherein the neural network is trained to process an input textual snippet, recognize an orientation of the input textual snippet, and provide an output indicating a degree of rotation needed to correct the orientation of the input textual snippet;

determining, based on outputs from the neural network, a degree of rotation needed to rotate the document image; and rotating the document image by the degree of rotation determined based on the outputs from the neural network.

16. The computer program product of claim 15, wherein the instructions are further translatable by the processor for:

segmenting the document image into bounding boxes, the segmenting including generating a bounding box defining a connected segment of black pixels in the document image, wherein the bounding box defines a set of coordinates in the document image that contains the connected segment of black pixels.

17. The computer program product of claim 16, wherein the instructions are further translatable by the processor for:

randomly selecting textual snippets from the bounding boxes; and testing each of the textual snippets randomly selected from the bounding boxes using the neural network.

18. The computer program product of claim 17, wherein the instructions are further translatable by the processor for:

conducting a statistical analysis on results from the neural network, wherein the statistical analysis yields a confidence that a most-common output from the neural network is incorrect for the document image; and checking the confidence during the testing until the confidence reaches or exceeds a proscribed limit.

19. The computer program product of claim 17, wherein the instructions are further translatable by the processor for:

determining whether a minimum number of samples of the textual snippets from the bounding boxes has been reached; and responsive to the minimum number of samples of the textual snippets from the bounding boxes has been reached, stop randomly selecting textual snippets from the bounding boxes and determining, based on the testing, how many votes are for each of a plurality of directions.

20. The computer program product of claim 15, wherein the neural network is configured for outputting a probability value indicating that a zero degree of rotation or zero number of turns is needed to correct the orientation of the input textual snippet, a probability value indicating that a 90 degree of rotation or a single right or left turn is needed to correct the orientation of the input textual snippet, a probability value indicating that a 180 degree of rotation is or two right or left turns are needed to correct the orientation of the input textual snippet, and a probability value indicating that a 270 degree of rotation is or three right or left turns are needed to correct the orientation of the input textual snippet.

\* \* \* \* \*